United States Patent
Kamara

(10) Patent No.: US 9,356,304 B2
(45) Date of Patent: May 31, 2016

(54) ANODE RECIRCULATION PUMP CONTROL STRATEGY

(75) Inventor: Jim Kamara, Mainz (DE)

(73) Assignee: GM Global Technology Operations LLC, Detroit, MI (US)

(*) Notice: Subject to any disclaimer, the term of this patent is extended or adjusted under 35 U.S.C. 154(b) by 2638 days.

(21) Appl. No.: 12/013,135

(22) Filed: Jan. 11, 2008

(65) Prior Publication Data

US 2009/0181270 A1    Jul. 16, 2009

(51) Int. Cl.
*H01M 8/04* (2006.01)
*H01M 16/00* (2006.01)

(52) U.S. Cl.
CPC ........ *H01M 8/0491* (2013.01); *H01M 8/04626* (2013.01); *H01M 16/006* (2013.01); *H01M 8/04097* (2013.01); *Y02E 60/50* (2013.01)

(58) Field of Classification Search
None
See application file for complete search history.

(56) References Cited

U.S. PATENT DOCUMENTS

2008/0187790 A1* 8/2008 Kamihara et al. ............ 429/13
2009/0110981 A1* 4/2009 Saito et al. ................... 429/22

FOREIGN PATENT DOCUMENTS

WO   WO 2006064893 A2 *  6/2006
WO   WO 2007043548 A1 *  4/2007

* cited by examiner

*Primary Examiner* — Barbara Gilliam
*Assistant Examiner* — Stephan Essex
(74) *Attorney, Agent, or Firm* — John A. Miller; Miller IP Group, PLC

(57) ABSTRACT

A control strategy for controlling how much current can be provided by a fuel cell stack to a system load during a power up-transient. When a power up-transient command is given, the control strategy limits the amount of power or current that the stack can provide to the load based on how fast an anode exhaust gas recirculation pump can meet the exhaust gas recirculation demand so that the ratio between the recirculated anode exhaust gas and the fresh hydrogen remains substantially constant. Thus, during the power up-transient, the relative humidity provided by the combination of the fresh hydrogen and the anode exhaust gas maintains the membranes in the stack at the desired humidity level. Any difference between the commanded stack power and the limited stack power during the power up-transient can be provided by a system battery.

12 Claims, 1 Drawing Sheet

ANODE RECIRCULATION PUMP CONTROL STRATEGY

BACKGROUND OF THE INVENTION

1. Field of the Invention

This invention relates generally to a system and method for controlling the output power or current from a fuel cell stack at power up-transients and, more particularly, to a system and method for limiting stack output power or current during power up-transients so as to allow an anode exhaust gas recirculation pump to maintain the ratio of recirculated anode exhaust gas to fresh hydrogen substantially constant.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane in a fuel cell needs to have a certain relative humidity so that the ionic resistance across the membrane is low enough to effectively conduct protons. This humidification may come from the stack water by-product or external humidification. The flow of the reactant gas through the flow channels has a drying effect on the membrane, most noticeably at an inlet of the flow channels. Also, the accumulation of water droplets within the flow channels from the membrane relative humidity and water by-product could prevent reactant gas from flowing therethrough, and cause the cell to fail, thus affecting the stack stability. The accumulation of water in the reactant gas flow channels is particularly troublesome at low stack output loads.

It is desirable that the distribution of hydrogen within the anode flow channels in a fuel cell stack be substantially constant for proper fuel cell stack operation. Some fuel cell systems input more hydrogen into the fuel cell stack than is necessary for a certain output load of the stack so that the anode gas is more evenly distributed. However, because of this requirement, the amount of hydrogen in the anode exhaust gas is significant, and would lead to low system efficiency if that hydrogen were discarded. Therefore, it is known in the art to recirculate the anode exhaust gas using an anode recirculation pump back to the anode input to reuse the discarded hydrogen.

When a request for high stack power is given, referred to herein as a power up-transient, a command is given to the compressor to provide a desired amount of cathode air to the stack cathode and a command is given to the anode recirculation pump and fresh hydrogen injectors to provide a desired amount of hydrogen to the stack anode to satisfy the power request. Typically, the compressor is able to provide the cathode air very quickly to meet the cathode input requirements and the hydrogen injectors are able to provide the fresh hydrogen very quickly. However, the time it takes the anode recirculation pump to spin up is slower, which for some period time after the power up-transient is requested, prevents the desired amount of recirculated anode exhaust gas from being sent to the anode inlet side of the stack. This can temporarily reduce the performance of the stack because of local drying of the anode inlet region. Further, the ratio of fresh hydrogen to recirculated anode exhaust gas changes where more fresh hydrogen is provided relative to the recirculated anode exhaust gas. Because the fresh hydrogen is dry and the recirculated anode exhaust gas is humidified, the humidity level within the fuel cells goes down especially in the anode inlet region, which causes the membranes in the fuel cells to at least partially dry out, which can induce mechanical stress that may lead to pinholes or other perforations being formed in the fuel cell membranes. Furthermore, in this particular situation, i.e., up-transient, the desired anode gas volume flow may not be met. This can lead to local hydrogen starvation due to lower volumetric flow in the anode outlet region that can negatively impact water management. This in turn can lead to damage of the cathode catalyst support which heavily impacts fuel cell performance and durability.

SUMMARY OF THE INVENTION

In accordance with the teachings of the present invention, a control strategy for controlling how much current can be provided by a fuel cell stack to a system load during a power up-transient is disclosed. When a power up-transient command is given, the control strategy limits the amount of power or current that the stack can provide to the load based on how fast an anode exhaust gas recirculation pump can meet the exhaust gas recirculation demand so that the ratio between the recirculated anode exhaust gas and the fresh hydrogen remains substantially constant. Thus, during the power up-transient, the relative humidity provided by the combination of the fresh hydrogen and the anode exhaust gas maintains the membranes in the stack at the desired humidity level. Further, a high enough anode gas throughput is assured that avoids any local hydrogen starvation effects. Any difference between the commanded stack power and the limited stack power during the power up-transient can be provided by a system battery.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a control strategy for limiting stack output power during power up-transient is merely exemplary in nature, and is in no way intended to limit the invention or its applications or uses.

Figure 1:
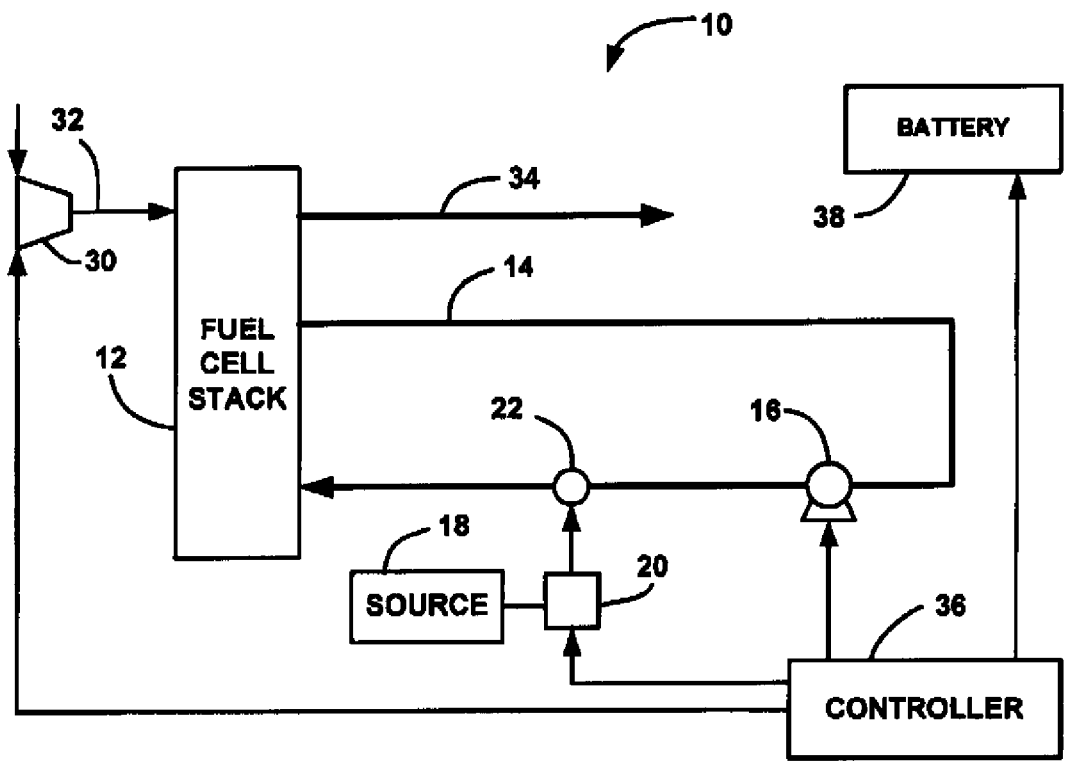
FIG. 1 is a schematic block diagram of a fuel cell system employing an anode exhaust gas recirculation sub-system.

FIG. 1 is a schematic block diagram of a fuel cell system 10 including a fuel cell stack 12. The fuel cell system 10 employs anode exhaust gas recirculation where an anode exhaust gas from the fuel cell stack 12 is sent to an anode recirculation line 14 that recirculates the anode exhaust gas back to an anode input of the fuel cell stack 12. An anode exhaust gas recirculation pump 16 pumps the anode exhaust gas through the recirculation line 14 at a desirable rate to accommodate the stack power demands. Fresh hydrogen from a hydrogen source 18 is injected into the recirculation line 14 by an injector 20 where the recirculated anode exhaust gas and the fresh hydrogen from the source 18 are mixed in a mixing junction 22.

As is well understood to those skilled in the art, it is desirable to maintain a constant ratio of the volume of the recirculated anode exhaust gas to the fresh hydrogen across all stack power outputs so that the hydrogen is used efficiently and the humidity of the combined fresh hydrogen and recirculated anode exhaust gas is at a known level for humidification control of the membranes in the fuel cell stack 12. Particularly, the fresh hydrogen from the source 18 is dry and the recirculated anode exhaust gas from the fuel cell stack 12 is wet as a result of the operation of the fuel cell stack 12. By controlling the mixture of the fresh hydrogen and the recirculated anode exhaust gas, a known level of humidity entering the stack 12 from the anode side is provided so that the membrane relative humidity can be known. In one embodiment, the recirculation rate can be defined as $\dot{V}_{N2/H2\ recirculated}/\dot{V}_{H2}$.

The fuel cell system 10 also includes a compressor 30 that provides air on a cathode input line 32 to the cathode side of the fuel cell stack 12. The cathode exhaust gas from the stack 12 is output from the stack 12 on a cathode exhaust gas line 34. The fuel cell system 10 also includes a battery 38. Fuel cell systems for a vehicle typically include a battery that provides supplemental or auxiliary power in combination with the fuel cell stack 12 to satisfy system loads. For those times that the fuel cell stack 12 is able to satisfy the power demand, current from the fuel cell stack 12 can also be used to recharge the battery 38.

A controller 36 controls the speed of the recirculation pump 16, the injector 20 and the compressor 30 in response to a load demand on the fuel cell stack 12 to provide the desired stack output power, as is well understood by those skilled in the art.

According to the invention, the controller 36 limits the stack current ramp up at power up-transients so that the output power of the fuel cell stack 12 follows the ability of the recirculation pump 16 to provide the recirculated anode exhaust gas so that the ratio of the mixture of the fresh hydrogen to the recirculated anode exhaust gas remains substantially constant during the power up-transient.

Figure 2:
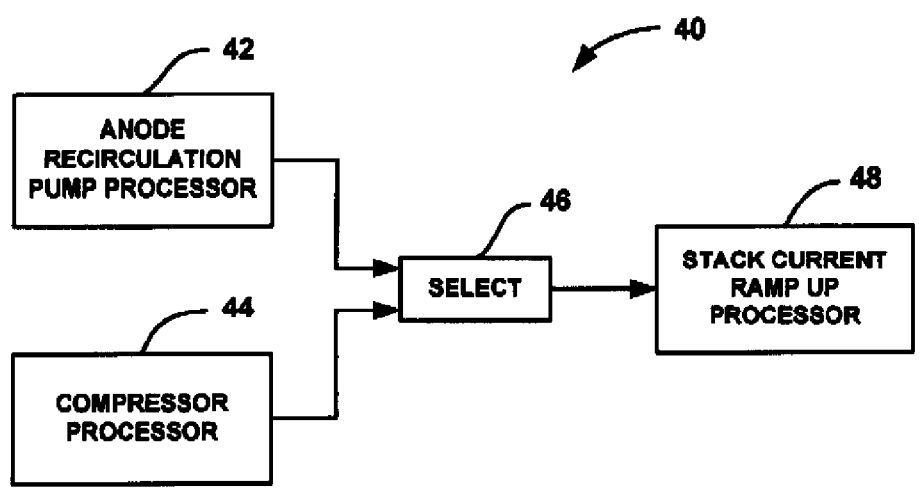
FIG. 2 is a block diagram of a control strategy for controlling the amount of power provided by a fuel cell stack during a power up-transient based on the ability of an anode recirculation pump to meet the anode recirculation demand, according to an embodiment of the present invention.

FIG. 2 is a block diagram of a control system 40 depicting this operation of the controller 36. The control system 40 includes an anode recirculation pump processor 42 and a compressor processor 44. In response to a power up-transient for an increased load demand on the fuel cell stack 12, the anode recirculation pump processor 42 provides an output signal that identifies the maximum current draw from the fuel cell stack 12 based on the ability of the recirculation pump 16 to spin up fast enough to provide the desired anode exhaust gas that maintains the ratio of the recirculated anode exhaust gas to the fresh hydrogen substantially constant. As time goes by and the speed of the recirculation pump 16 increases, the value of the output signal from the processor 42 increases. Additionally, the compressor processor 44 provides an output signal that identifies the maximum current draw from the fuel cell stack 12 based on the ability of the compressor 30 to provide cathode input air fast enough for the commanded stack load.

A selection device 46 selects the lower of the two values from the output signals from the processors 42 and 44, which will generally be the value from the anode recirculation pump processor 42 because the compressor 30 will typically be able to provide compressor air to meet the power demand faster than the recirculation pump 16 will be able to provide the recirculated anode exhaust gas. The selected maximum stack current is sent to a stack power or current ramp up processor 48 that limits the output power of the fuel cell stack 12 to what is able to be provided by the recirculation pump 16 or the compressor 30. Because the maximum stack current for a power up-transient based on this process may be less than the commanded current needed to meet the load, any difference between the maximum fuel cell stack power allowed during the power up-transient and the power necessary to meet the demand can be provided by the battery 38. Once the recirculation pump 16 is able to meet the commanded fuel cell stack load, where the outputs from the processors 42 and 44 will be nearly the same, the battery 38 can be disengaged from the load.

By using this control strategy it is possible to reduce the significant anode inlet humidity changes during load transients. This provides an improved mechanical durability of the MEAs in the stack anode inlet region. Higher overall anode gas throughput improves local water management on the anode outlet region and avoids local hydrogen starvation effects which negatively impact stack durability. Further, the power output during load transients will be better due to a better reactant supply via higher gas flows and better water management during the load transient.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack;
a compressor for providing cathode inlet air to a cathode side of the fuel cell stack;
an anode recirculation line for providing an anode exhaust gas from an anode output of the fuel cell stack to an anode input for an anode side of the fuel cell stack;
an anode exhaust gas recirculation pump for pumping the anode exhaust gas from the anode output to the anode input;
a source providing fresh hydrogen to the anode recirculation line to be mixed with the anode exhaust gas; and
a controller that is programmed to control the compressor and the anode recirculation pump, said controller being responsive to a demand for increased output power from the fuel cell stack, said controller limiting a current output ramp up of the fuel cell stack based on how fast the anode recirculation pump can provide the recirculated anode exhaust gas to the anode input for the increased power demand so as to maintain a ratio of fresh hydrogen to recirculated anode exhaust gas substantially constant during a power up-transient.

2. The system according to claim 1 wherein the controller determines the ability of both the anode recirculation pump and the compressor to meet the increased power demand based on output signals from an anode recirculation pump processor and a compressor processor, and the controller selects a maximum current draw that the slower of the anode recirculation pump or the compressor can meet.

3. The system according to claim 1 further comprising a battery, said battery providing additional power to meet the increased power demand if the anode recirculation pump cannot provide the recirculated anode exhaust gas fast enough.

4. The system according to claim 1 further comprising an injector for injecting the fresh hydrogen to the anode recirculation line from the source.

5. The system according to claim 1 wherein the fuel cell system is on a vehicle.

6. A fuel cell system comprising:
a fuel cell stack;
an anode recirculation line for directing an anode exhaust gas from the fuel cell stack to an anode input for an anode side of the fuel cell stack;
an anode recirculation pump for recirculating the anode exhaust gas from the anode output to the anode input;
a source providing fresh hydrogen to the anode recirculation loop to be mixed with the anode exhaust gas; and
a controller that is programmed to control the anode recirculation pump, said controller being responsive to an increased power demand from the fuel cell stack and limiting the output power of the fuel cell stack based on the ability of the recirculation pump to operate fast enough to provide the recirculated anode exhaust gas to the anode side of the fuel cell stack at a substantially constant rate during a power up-transient to reduce anode inlet humidity changes.

7. The system according to claim 6 further comprising a compressor for provide cathode inlet air to a cathode side of the fuel cell stack.

8. The system according to claim 6 wherein the controller determines the ability of both the anode recirculation pump and the compressor to meet the increased power demand based on output signals from an anode recirculation pump processor and a compressor processor, and the controller selects a maximum current draw that the slower of the anode recirculation pump or the compressor can meet.

9. The system according to claim 6 further comprising a battery, said battery providing additional power to meet the increased power demand if the anode recirculation pump cannot provide the recirculated anode exhaust gas fast enough.

10. The system according to claim 6 wherein the controller limits a current output ramp up of the fuel cell stack based on how fast the anode recirculation pump can provide the recirculated anode exhaust gas to the anode input for the increased power demand so as to maintain a ratio of fresh hydrogen to recirculated anode exhaust gas substantially constant.

11. The system according to claim 6 further comprising an injector for injecting the fresh hydrogen to the anode recirculation line from the source.

12. The system according to claim 6 wherein the fuel cell system is on a vehicle.

* * * * *